United States Patent Office 3,767,816
Patented Oct. 23, 1973

3,767,816
DIURETIC THIOUREAS
Jack N. Moss and Albert S. Sambuca, Philadelphia, Pa.,
assignors to Rohm and Haas Company, Philadelphia, Pa.
No Drawing. Filed Aug. 26, 1971, Ser. No. 175,330
Int. Cl. A61k 27/00
U.S. Cl. 424—322
6 Claims

ABSTRACT OF THE DISCLOSURE

Specific thioureas of the general class 1-aryl-3-(2-hydroxyethyl)-thioureas have been found to possess potent diuretic properties.

---

This invention relates to the discovery of diuretic properties of a class of thioureas of the generic formula

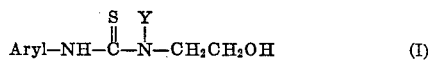

wherein Aryl stands for (a) the group

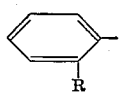

wherein R is methyl or ethyl, (b) the group

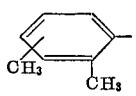

(c) the group

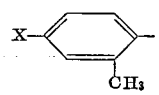

wherein X is chloro or bromo, (d) the 2,4,6-trimethylphenyl group, or
(e) an α-naphthyl group and
Y is hydrogen or methyl.

Diuretics now in common use include the following types: (a) mercurials such as meralluride, (b) thiazides such as chlorothiazide or hydrochlorothiazide, and (c) miscellaneous pharmaceuticals such as chlorthalidone, furosemide, theophylline derivatives and triamterene. None of these however, are thioureas or are closely related structurally thereto.

Unsymmetrical thioureas of the type herein disclosed are known in the art, and are commonly prepared by the addition of ethanolamine to an aryl isothiocyanate, to wit:

ArylNCS + $H_2NCH_2CH_2OH \rightarrow$
ArylNHC(S)NHCH$_2$CH$_2$OH

For example the preparation of α-phenylthiourea is described in Organic Syntheses 28, 89 (1948), and that of α-naphthylthiourea in the J. Chem. Education 25, 618 (1948). A good review may be found in Chemical Reviews 55, 181 (1955).

The preparation of 1-(2,4 - dimethylphenyl)-3-(2-hydroxyethyl)-thiourea is typical of this method of preparation.

PREPARATION D

Preparation of 2,4-(CH$_3$)$_2$C$_6$H$_3$NHC(S)NHCH$_2$CH$_2$OH

(a) Preparation of 2,4-dimethylphenyl isothiocyanate.—To 75 g. (0.6 mole) of freshly distilled 2,4-dimethylaniline was added dropwise 82 ml. of concentrated ammonium hydroxide followed by the dropwise addition of 42 ml. (0.7 mole) of carbon disulfide. The temperature was held at 30–35° C. for 1 hour then cooled in an ice bath to give crystals which were separated and washed with 3% ammonium chloride and a small amount of ethanol. The solid was resuspended in 500 ml. of water and there was added an aqueous solution of 57 g. (0.6 mole) of chloracetic acid neutralized with 32 g. of sodium carbonate in about 10 minutes at 30° C. This mixture was stirred 1 hour and then there was added an aqueous solution of 41 g. (0.3 mole) of zinc chloride in 45 minutes with the pH maintained at 7 with 4 N sodium hydroxide. After stirring 1 hour the mixture was cooled to 4° C. and the residue was filtered off and dried over P$_2$O$_5$. The residue was extracted with petroleum ether and the extract stripped of solvent to give 54 g. of 2,4-dimethylphenyl isothiocyanate. By infrared examination this was found to be essentially pure.

(b) Preparation of 1-(2,4-dimethylphenyl)-3-(2-hydroxyethyl)-thiourea.—To 20 g. (0.12 mole of 2,4-dimethylphenyl isothiocyanate in 30 ml. of acetone was added dropwise 10 g. (0.16 mole) of ethanolamine in 20 ml. acetone. The solution was refluxed 1 hour then cooled to 4° C. to give crystals which were filtered off, washed with cold ethanol and dried. The product was 16.8 g. of white crystals melting at 137.5–139° C. This is a 54% yield of 1-(2,4-dimethylphenyl)-3-(2-hydroxyethyl)-thiourea.

Schroeder in Chem. Reviews 55, 183–189 (1955), discusses the biological properties of thioureas. Specifically discussed are antitubercular, antithyroid, hypnotic, anesthetic, anthelmintic, antibacterial, antiphenoloxidase, insecticidal and rodenticidal properties. Diuresis is not a specific topic in the survey paper. It is of interest to note that regarding its discussion on the well-known rat poison, α-naphthylthiourea, the statement is made that this causes pulmonary edema in dogs and rats. However, in a paragraph on miscellaneous biological properties U.S. Pat. 2,598,936 is cited. This patent discloses certain disubstituted cyanoalkanoylureas and thioureas as diuretic agents but the structures are far removed from those of the present invention.

The literature is likewise sparse on compounds of the structures of present interest, ArylNHC(S)NHCH$_2$CH$_2$OH French Pat. 1,356,908 discloses such structures only as intermediates for preparing 2-(arylamino)thiazolines.

The compounds of this invention and related compounds were evaluated by a modified Lipshitz method for evaluating diuresis (see Journal of Pharmacology and Experimental Therapeutics 79, 97 (1943). The modified method was to administer candidate diuretics orally to standard Wistar strain white rats, which had been starved for 24 hours and deprived of water for 16 hours, 25 ml./kg. body weight of a 0.85% saline solution containing the test compound in an amount corresponding to 10 mg. per kg. of body weight or less. Six animals were used per treatment. The animals were then housed in pairs in metabolic cages and readings of the volume of urine taken 5 hours and 24 hours later. Controls wherein only saline solution was administered and standards using hydrochlorothiazide and furosecide were run concurrently. The results are given in terms of the minimum diuretic dose. By this is meant the dose which resulted in a 50% or greater increase in the total volume of urine for each treated group of animals. When the treatment was no more active than the control, a "none" designation was used. A minimum diuretic dose of 10 mg./kg. or less is considered a potent diuretic.

Tables I and II give the identity of structures evaluated and reported herein. Table III gives representative minimum diuretic dose values obtained.

TABLE I.—IDENTITY OF THIOUREAS $$\text{Aryl}-\text{NH}-\overset{S}{\underset{\|}{C}}-\overset{Y}{\underset{|}{N}}-CH_2CH_2OH$$

| Preparation: | Aryl | Y | Melting point (° C.) | Empirical formula | Identity[a]—Analysis (percent) | | | |
|---|---|---|---|---|---|---|---|---|
| | | | | | C | H | N | S |
| A | 2-CH₃C₆H₄— | H | 124 | | French Pat. 1,356,908 | | | |
| B | 2-C₂H₅C₆H₄— | H | 131 | C₁₁H₁₆N₂OS | 58.6 (59.9) | 7.0 (7.1) | 12.4 (12.5) | 14.5 (14.0) |
| C | 2,3-(CH₃)₂C₆H₃— | H | 136 | C₁₁H₁₆N₂OS | 58.8 | 7.3 | 12.5 | 14.4 |
| D | 2,4-(CH₃)₂C₆H₃— | H | 139 | C₁₁H₁₆N₂OS | Maybridge Chemical Co. catalog | | | |
| E | 2,5-(CH₃)₂C₆H₃— | H | 159 | C₁₁H₁₆N₂OS | 58.9 | 7.3 | 12.3 | 14.4 |
| F | 2,6-(CH₃)₂C₆H₃— | H | 129 | | French pat. 1,356,908 | | | |
| G | 2-CH₃-4-ClC₆H₃— | H | 127 | C₁₀H₁₃ClN₂OS | 49.3 (49.2) | 5.5 (5.6) | 11.6 (11.5) | 13.3 (13.1) |
| H | 2-CH₃-4-BrC₆H₃— | H | 145 | C₁₀H₁₃BrN₂OS | 41.9 (41.5) | 4.7 (4.5) | 9.7 (9.6) | 11.1 (11.1) |
| I | 2,4,6-(CH₃)₃C₆H₂— | H | 132 | C₁₂H₁₈N₂OS | 60.7 (60.5) | 7.8 (7.6) | 11.9 (11.8) | |
| J | α-Naphthyl | H | 168 | | French pat 1,356,908 | | | |
| K | 2,4-(CH₃)₂C₆H₃ | CH₃ | 102 | C₁₂H₁₈N₂OS | 60.2 | 7.5 | 11.8 | 13.4 (13.4) |

[a] Literature reference for a known compound; analytical data for a novel compound.

TABLE II—STRUCTURES RELATED TO THE THIOUREAS OF TABLE I

Structures

Preparation:
L ......... 2-CH₃-5-ClC₆H₃NHC(S)NHCH₂CH₂OH
M ......... 2-CH₃-6-ClC₆H₃NHC(S)NHCH₂CH₂OH
N ......... 2-CH₃-4-CH₃OC₆H₃NHC(S)NHCH₂CH₂OH
O ......... C₆H₅NHC(S)NHCH₂CH₂OH
P ......... 4-CH₃C₆H₄NHC(S)NHCH₂CH₂OH
Q ......... 3,4-(CH₃)₂C₆H₃NHC(S)NHCH₂CH₂OH
R ......... 3,5-(CH₃)₂C₆H₃NH(S)NHCH₂CH₂OH
S ......... 2-CH₃-3-ClC₆H₃NHC(S)NHCH₂CH₂OH
T ......... 2,4-(CH₃)₂C₆H₃NH(S)NHCH₂CH₂CH₂CH₃
U ......... 2,4-(CH₃)₂C₆H₃NHC(S)NHCH(CH₃)CHOH
V ......... 2,4-(CH₃)₂C₆H₃NHC(S)NHCH₂CH₂)OH
W ......... 2,4-(CH₃)₂C₆H₃NHC(S)NHCH₂CH₂OCH₃
X ......... 2,4-(CH₃)₂C₆H₃NHC(S)NHCH₂CH₂SH
Y ......... 2,4-(CH₃)₂C₆H₃NHC(S)NHCH₂CH₂NH₂
Z ......... 2,4-(CH₃)₂C₆H₃NHC(S)NHC₆H₅
AA ........ 2,4-(CH₃)₂C₆H₃NHC(S)N(CH₃)₂
AB ........ 2-isoC₃H₇C₆H₄NHC(S)NHCH₂CH₂OH
AC ........ β-NaphthylNHC(S)NHCH₂CH₂OH
AD ........ 2,6-(CH₃)₂C₆H₃NHC(O)NHCH₂CH₂OH

TABLE III

Diuretic activity (rat)

| Preparation: | Minimum diuretic dose (mg./kg.) |
|---|---|
| A | 0.9 |
| B | 1.35 |
| C | <10 |
| D | 0.5 |
| E | 1–2 |
| F | 0.9 |
| G | 1.8 |
| H | <10 |
| I | <10 |
| J | <10 |
| K | 4.0 |
| L | >10 |
| M | >10 |
| N | >10 |
| O | None |
| P | None |
| Q | None |
| R | None |
| S | None |
| T | None |
| U | None |
| V | None |
| W | >10 |
| X | None |
| Y | >10 |
| Z | None |
| AA | None |
| AB | None |
| AC | None |
| AD | None |
| Hydrochlorothiazide | 0.5–2 |
| Furosemide | 5 |
| Control | None |

Secondary evaluations employing a dose-response titration were conducted concurrently on Compound D, furosemide and hydrochlorothiazide. Groups of six rats were employed for each compound and at each dosage (mg./kg.) level administered orally in saline solution for saline-loaded rats or in water for water-loaded rats. The volume of urine was measured at 5 hours and 24 hours. Pooled samples of the 5 hour urine collection from each group were analyzed for sodium, potassium and chloride ions. The results are given in Table IV for saline-loaded rats and in Table V for water-loaded rats.

TABLE IV.—DIURETIC EFFECT[1] ON SALINE-LOADED RATS

| Agent | Dose (mg./kg. P.O.) | Percent of total load excreted/6 rats | | Meq./6 rats/5 hrs. | | |
|---|---|---|---|---|---|---|
| | | 5 hrs. | 24 hrs. | Na⁺ | K⁺ | Cl⁻ |
| Saline control | [2] 25 | 26.2 | 67 | 1.6 | 1.05 | 1.2 |
| Compound D | 0.25 | 38.0 | 68 | 1.7 | 1.1 | 1.8 |
| Do | 0.5 | 40.5 | 73 | 1.8 | .74 | 2.1 |
| Do | 1.0 | 65.0 | 99 | 2.0 | .93 | 1.6 |
| Do | 2.0 | 104 | 125 | 2.6 | 1.1 | 2.7 |
| Furosemide | 1.0 | 30.3 | 53 | 1.8 | 0.9 | 2.0 |
| Do | 2.5 | 37 | 68 | 1.5 | 1.7 | 1.8 |
| Do | 5.0 | 63 | 88 | 2.4 | .70 | 2.9 |
| Do | 10.0 | 93 | 125 | 3.3 | 1.3 | 4.3 |
| Hydrochlorothiazide | 0.25 | 24 | 46 | 1.5 | .60 | 1.9 |
| Do | 0.50 | 44 | 71 | 2.6 | 1.0 | 3.1 |
| Do | 1.0 | 48 | 76 | 2.9 | 1.1 | 3.6 |
| Do | 2.0 | 77 | 94 | 2.9 | 0.9 | 3.5 |

[1] Onset of diuresis with all 3 agents occurred within 45 minutes after dosing.
[2] Ml./kg.

TABLE V.—DIURETIC EFFECT ON WATER-LOADED RATS

| Agent | Dose (mg./kg.) | Percent of total load excreted/6 rats | | Meq./6 rats/5 hrs. | | |
|---|---|---|---|---|---|---|
| | | 5 hrs. | 24 hrs. | Na⁺ | K⁺ | Cl⁻ |
| H₂O | [1] 25 | 43.5 | 70.5 | .31 | .5 | .38 |
| Compound D | 1 | 70 | 99 | .52 | .93 | .68 |
| Do | 2 | 63 | 95 | .65 | .9 | .67 |
| Do | 5 | 105 | 138 | 1.7 | .8 | 1.6 |
| Do | 10 | 171 | 193 | 2.1 | .93 | 2.5 |
| Do | 30 | 153 | 163 | 2.0 | .65 | 2.3 |
| Furosemide | 5 | 47.5 | 80.5 | .48 | .55 | 0.7 |
| Do | 10 | 55 | 92 | .57 | 0.4 | 0.85 |
| Do | 25 | 197 | 233 | 4.2 | 2.0 | 5.5 |
| Do | 100 | 267 | 399 | 8.2 | 2.7 | 6.4 |
| Hydrochlorothiazide | 5 | 82 | 110 | 2.2 | 1.1 | 2.9 |
| Do | 10 | 73 | 113 | 1.5 | 0.8 | 2.1 |

[1] Ml./kg.

It will be noted that with Compound D there appears to be a ceiling effect on the potassium ion, i.e., the potassium excretion appears to remain substantially constant with increasing doses of the drug, whereas with furosemide the amount of potassium ion excreted increases with increasing doses. This indicates that with the compounds of this invention there is a potassium-sparing effect, which is a well-recognized attribute for diuretics. It is also advantageous that Compound D functions as a diuretic in both water-loaded and saline-loaded animals.

In another evaluation, saline-loaded dogs using 20 ml. of saline solution per kg. were treated orally (P.O.) with Compound D at 1, 2.5 and 5.0 mg. per kg. of body weight. One animal was employed at each dosage level. Urine samples were measured at 5 and 24 hour periods. In another evaluation with saline-loaded dogs, individual animals were treated intravenously (I.V.) with Compound D in propylene glycol at a dosage of 2.5 and 5.0 mg./kg. Urine samples were measured at 5 and 24 hr. periods. Table VI gives the results of the two tests.

TABLE VI.—DIURETIC EFFECT ON DOGS

| Agent | Dose (mg./kg.) | Percent of total load excreted | |
|---|---|---|---|
| | | 5 hrs. | 24 hrs. |
| Saline | 20,[1] P.O. | 44 | 68 |
| Compound D | 1, P.O. | 47 | 108 |
| Do | 2.5, P.O. | 55 | 118 |
| Do | 5.0, P.O. | 57 | 138 |
| Do | 2.5, I.V. | 79 | 125 |
| Do | 5.0, I.V. | 71 | 119 |
| Hydrochlorothiazide | 5.0, P.O. | 64 | 129 |
| Furosemide | 5.0, P.O. | 244 | 244 |

[1] Ml./kg.

It was observed that diuresis occurred in the dog at the lowest level of 1 mg./kg. There was a delay in the onset of diuresis which appears to be independent of the route of administration.

The thioureas of this invention may be administered alone or more preferably in combination with an excipient diluent, or pharmaceutically acceptable carrier. Such a carrier may be either a solid or liquid. Exemplary of solid excipients or diluents are lactose, terra alba, sucrose, talc, gelatin, agar, pectin, acacia, magnesium stearate and the like. Exemplary of liquid carriers are water, syrup, glycerine, honey, olive oil and the like. Formulation of the diuretics of this invention may, for example, constitute powders, tablets, capsules, solutions, emulsions, and the like.

The following examples are provided for the purpose of illustration and not by way of limitation of the invention as defined in the claims.

EXAMPLE 1

The following ingredients are combined:

| | Parts |
|---|---|
| 1-(2,4-dimethylphenyl)-3-(2-hydroxyethyl)thiourea | 35 |
| Magnesium stearate | 5 |
| Lactose | 60 |

The combination is thoroughly milled and then screened. It is then in a form adaptable for putting into a No. 0 hard gelatine capsule.

EXAMPLE 2

The following ingredients are combined:

| | Parts |
|---|---|
| 1-(2,6-dimethylphenyl)-3-(2-hydroxyethyl)thiourea | 40 |
| Peanut oil | 60 |

The combination is thoroughly mixed into a thick slurry. It can then be put into soft gelatin capsules.

EXAMPLE 3

The following ingredients are combined:

| | Parts |
|---|---|
| 1-(2-methylphenyl)-3-(2-hydroxyethyl)thiourea | 2 |
| Calcium sulfate dihydrate | 65 |
| Sucrose | 25 |
| Starch | 5 |
| Talc | 2 |
| Stearic acid | 1 |

The first three ingredients are thoroughly wet with a hot 10% gelatin solution and then dried on drying trays at about 125° F. The resulting granules are ground and then thoroughly mixed in a blending mill with the last three ingredients. The resulting powder is passed through a No. 60 mesh screen and can then be compressed into tablets.

For parenteral application these compounds can be dispersed in sterile aqueous suspension or dissolved in a pharmacologically acceptable oil or oil-water emulsion. Suitable excipients can also be added.

There are circumstances where a combination of the thioureas of this invention with a pharmaceutically accepted diuretic such as a thiazide would be advantageous.

The method of achieving diuresis in accordance with this invention comprises administering internally to an animal organism a compound as represented by Formula I, usually combined with an excipient, for example, any of the above compositions, in an amount to produce the diuretic effect. The administration may be parenterally or orally, the latter being the preferred route. Advantageously equal doses will be administered from one to six times daily.

The dosage required to achieve diuresis in the animal organism will vary with various factors such as the species of animals, general health and tolerances of the animal, weight, sex and age of the animal, the nature and severity of the disease being treated and the like. Generally a total daily dosage would be in the range of 0.1 to 10 mg. per kg. of body weight.

The thioureas of this invention provide a new class of very effective diuretics. This is surprising and unexpected since many compounds of closely related structure exhibit no diuretic activity whatsoever.

We claim:

1. A method of effecting diuresis in an animal having a tendency to accumulate excess water, which comprises administering to said animal an effective amount for effecting diuresis, of a thiourea of the formula $$\text{Aryl-NH-}\underset{\|}{\overset{S}{C}}\text{-}\underset{|}{\overset{Y}{N}}\text{-CH}_2\text{CH}_2\text{OH}$$

wherein aryl stands for (a) 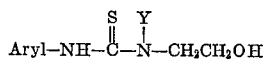

wherein R is methyl or ethyl, (b) 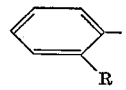

(c) 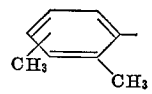

wherein X is chloro or bromo, (d) 2,4,6-trimethylphenyl, or
(e) 2-naphthyl and Y is hydrogen or methyl.

2. A method of effecting diuresis according to claim 1 wherein the thiourea is 1-(2,4-dimethylphenyl)-3-(2-hydroxyethyl)thiourea.

3. A method of effecting diuresis according to claim 3 wherein the thiourea is 1-(2,6-dimethylphenyl)-3-(2-hydroxyethyl)thiourea.

4. A method of effecting diuresis according to claim 1 wherein the thiourea is 1-(2-methylphenyl)-3-(2-hydroxyethyl)thiourea.

5. A method according to claim 1 wherein the diuretic amount is a daily dose in the range of 0.1 to 10 mg./kg. of body weight of the animal.

6. A method according to claim 1 wherein said diuretic amount is a daily dose in the range of 0.1 to 10 mg./kg. of body weight of the animal.

References Cited

FOREIGN PATENTS 1,356,908  12/1959  France.

OTHER REFERENCES

Chemical Abstracts 55: 1582d (1961).

JEROME D. GOLDBERG, Primary Examiner